(12) United States Patent
Choi et al.

(10) Patent No.: US 7,269,448 B2
(45) Date of Patent: Sep. 11, 2007

(54) METHOD FOR RECOGNIZING REQUEST FOR DATA TRANSMISSION BY MOBILE/BASE STATION RRC USING NETWORK TRANSFER DEVICE

(75) Inventors: Jihyuk Choi, Daejeon (KR); Kwang-Ryul Jung, Taejun (KR); Jun-Sik Kim, Kyunki-do (KR); Jae-Wook Shin, Daejeon (KR); Pyon Jung Song, Taejon (KR); Jong-Suk Chae, Daejeon (KR)

(73) Assignees: Electronics and Telecommunications Research Institute (KR); SK Telecom Co., Ltd. (KR)

( * ) Notice: Subject to any disclaimer, the term of this patent is extended or adjusted under 35 U.S.C. 154(b) by 904 days.

(21) Appl. No.: 09/990,446

(22) Filed: Nov. 9, 2001

(65) Prior Publication Data

US 2003/0093535 A1 May 15, 2003

(51) Int. Cl.
  *H04B 1/38* (2006.01)
  *H04Q 7/00* (2006.01)
(52) U.S. Cl. .................. 455/574; 709/226
(58) Field of Classification Search ........... 370/335, 370/349, 328; 455/515, 412.2, 127.5, 574; 709/232, 224, 226
See application file for complete search history.

(56) References Cited

U.S. PATENT DOCUMENTS

| | | | | |
|---|---|---|---|---|
| 5,745,695 A * | 4/1998 | Gilchrist et al. | ............. | 709/227 |
| 5,878,340 A * | 3/1999 | Asaoka et al. | ............ | 455/432.1 |
| 5,887,260 A * | 3/1999 | Nakata | ........................ | 455/436 |
| 5,974,310 A * | 10/1999 | Bilgic | ........................ | 455/418 |
| 5,991,287 A * | 11/1999 | Diepstraten et al. | ........ | 370/338 |
| 6,188,872 B1 * | 2/2001 | Nagira et al. | ............... | 455/11.1 |
| 6,246,883 B1 * | 6/2001 | Lee | ............................ | 455/507 |
| 6,301,479 B1 * | 10/2001 | Roobol et al. | .............. | 455/436 |
| 6,473,419 B1 * | 10/2002 | Gray et al. | .................. | 370/349 |
| 6,519,266 B1 * | 2/2003 | Manning et al. | ............ | 370/469 |
| 6,747,963 B1 * | 6/2004 | Park et al. | ................... | 370/335 |
| 6,798,764 B2 * | 9/2004 | Jiang | .......................... | 370/349 |
| 6,804,219 B2 * | 10/2004 | Koo et al. | ................... | 370/335 |
| 6,807,235 B2 * | 10/2004 | Yano et al. | ................. | 375/259 |
| 6,882,632 B1 * | 4/2005 | Koo et al. | ................... | 370/335 |
| 6,904,016 B2 * | 6/2005 | Kuo et al. | ................... | 370/235 |
| 7,006,482 B1 * | 2/2006 | Choi et al. | ................... | 370/342 |
| 2001/0055298 A1 * | 12/2001 | Baker et al. | ................. | 370/349 |
| 2002/0041576 A1 * | 4/2002 | Chang et al. | ............... | 370/331 |
| 2002/0065072 A1 * | 5/2002 | Lindh | .......................... | 455/422 |
| 2002/0111199 A1 * | 8/2002 | Yano et al. | ................. | 455/574 |
| 2002/0176378 A1 * | 11/2002 | Hamilton et al. | ........... | 370/328 |
| 2003/0007642 A1 * | 1/2003 | Jiang et al. | ................. | 380/272 |
| 2003/0050097 A1 * | 3/2003 | Amirijoo et al. | ........... | 455/560 |
| 2006/0063512 A1 * | 3/2006 | Bhatoolaul et al. | ...... | 455/412.1 |

* cited by examiner

*Primary Examiner*—Glenton B. Burgess
*Assistant Examiner*—Philip J. Chea
(74) *Attorney, Agent, or Firm*—Blakely Sokoloff Taylor & Zafman

(57) ABSTRACT

A method recognizes a request for data transmission by a mobile/base station RRC (Radio Resource Control) using a network transfer device, by which the mobile/base station RRC can recognize the request for data transmission using the network transfer device in a state where recognition of the request for data transmission is disabled. The mobile/base station RRC sets the network transfer device in a suspend state and recognizes a request for data transmission from an up/down link. The network transfer device in the suspend state recognizes the request for data transmission to the up/down link, and sends a message to the mobile/base station RRC to inform the mobile/base station RRC that it recognizes the request for data transmission. The mobile/base station RRC recognizes the request for data transmission according to a received message from the network transfer device and transits to an active state.

3 Claims, 7 Drawing Sheets

METHOD FOR RECOGNIZING REQUEST FOR DATA TRANSMISSION BY MOBILE/BASE STATION RRC USING NETWORK TRANSFER DEVICE

BACKGROUND OF THE INVENTION

1. Field of the Invention

The present invention relates to a method for recognizing a request for data transmission by a mobile/base station Radio Resource Control (RRC) using a network transfer device. More specifically, the present invention relates to a method for recognizing a request for data transmission by a mobile/base station RRC through data communications between mobile/base station packet data convergence protocols (PDCPs) or radio link controls (RLCs) used as the network transfer device capable of recognizing the request for data transmission.

2. Description of the Related Art

In general, the RRC state of a mobile/base station that is in use can be divided into four states, i.e., a CELL_DCH state, a CELL_FACH state, a CELL_PCH state, and a URA_PCH state.

Packet data such as Internet traffic are transferred in the CELL_DCH (using a dedicated channel DCH) or CELL_FACH (using a forward access channel FACH as a common channel) states. Subsequently, when the request for traffic transmission is temporarily interrupted, the CELL_ DCH or CELL_FACH state is transitted to the CELL_PCH or URA_PCH state without disconnection of channels, then all the mobile channels are disconnected but the paging channels PCH. The reason that the RRC state transits to the CELL_PCH or URA_PCH state without disconnection of channels in this process is that Internet traffic is characterized by intermittent transmission, and the initial access overhead between the mobile station and the base station has to be reduced during a second connection of channels. Hence, when the user requests data transmission in the CELL_PCH or URA_PCH states, the RRC state transits to the CELL_FACH state for data retransmission. This state transition is already disclosed in the prior art.

However, such a state transition according to the prior art makes it impossible to efficiently utilize the CELL_PCH or URA_PCH states because there is no method for recognizing the user's request for data transmission. This causes some problems such as an inefficient use of radio resources (i.e., continuously in the CELL_FACH state while not in use) and an initial access overhead (i.e., disconnection while not in use).

SUMMARY OF THE INVENTION

It is an object of the present invention to provide a method for recognizing a request for data transmission using message communication method between mobile/base station PDCP, or RLC and RRC, that is, network transfer devices capable of recognizing the request for data transmission from an up link (i.e., mobile station) or a down link (i.e., base station)

In one aspect of the present invention, there is provided a method for recognizing a request for data transmission by a mobile/base station RRC (Radio Resource Control) using a network transfer device, by which the mobile/base station RRC can recognize the request for data transmission using the network transfer device in a state where recognition of the request for data transmission is disabled, the method including: (a) the mobile/base station RRC setting the network transfer device in a suspend state; (b) the network transfer device recognizing the request for data transmission to an up/down link in the suspend state, and sending a message to the mobile/base station RRC to inform the mobile/base station RRC that it recognizes the request for data transmission; (c) the mobile/base station RRC recognizing the request for data transmission according to a received message from the network transfer device and transiting to an active state; and (d) the network transfer device transiting to the active state using the mobile/base station RRC.

In another aspect of the present invention, there is provided a system for controlling a mobile/base station radio resource, the system including: a unit for enabling a mobile/base station RRC to recognize a request for data transmission in a state where recognition of the request for data transmission is disabled; a unit for setting a network transfer device in a suspend state using the mobile/base station RRC; a unit for causing the network transfer device to recognize the request for data transmission to an up/down link and sending a message to the mobile/base station RRC to inform the mobile/base station RRC that the network transfer device in the suspend state recognizes the request for data transmission; a unit for causing the mobile/base station RRC to recognize the request for data transmission and transit to an active state according to a received message from the network transfer device; and a unit for transiting the network transfer device to the active state using the mobile/base station RRC.

The term "RRC" as used herein means a radio resource control protocol of the mobile/base station; the term "RLC" as used herein means an RLC (Radio Link Control) protocol control network of the mobile/base station used as a network transfer device; the term "PDCP" as used herein means a PDCP (Packet Data Convergence Protocol) control network of the mobile/base station as another network transfer device; the term "PDCP suspend request message" as used herein means a message CPDCP-SUSPEND-REQ sent from the mobile/base station RRC to set the PDCP as a network transfer device of the present invention in the suspend state; the term "PDCP suspend complete message" as used herein means a message CPDCP-SUSPEND-CNF for informing the mobile/base station RRC that the PDCP is in the suspend state according to the PDCP suspend request message; the term "PDCP data transmission request recognizing message" as used herein means a message CPDCP-RESUME-IND sent from the PDCP to inform the mobile/base station RRC that the PDCP in the suspend state recognizes the request for data transmission from the up/down link; the term "PDCP resume request message" as used herein means a message CPDCP-RESUME-REQ sent from the mobile/base station RRC in the active state upon receiving the transmission request recognizing message to transit the PDCP from the suspend state to the active state; the term "RLC suspend request message" as used herein means a message CRLC-SUSPEND-REQ sent from the mobile/base station RRC to set the RLC in the suspend state; the term "RLC suspend complete message" as used herein means a message CRLC-SUSPEND-CNF for informing the mobile/base station RRC that the RLC is in the suspend state according to the RLC suspend request message; the term "RLC data transmission request recognizing message" as used herein means a message CRLC-RESUME-IND sent from the RLC to inform the mobile/base station RRC that the RLC in the suspend state recognizes the request for data transmission from the up/down link; and the term "RLC resume request message" as used herein means a message CRLC-RESUME-REQ sent from the mobile/base station RRC in the active state upon receiving the transmission request recognizing message to transit the RLC from the suspend state to the active state.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best state contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
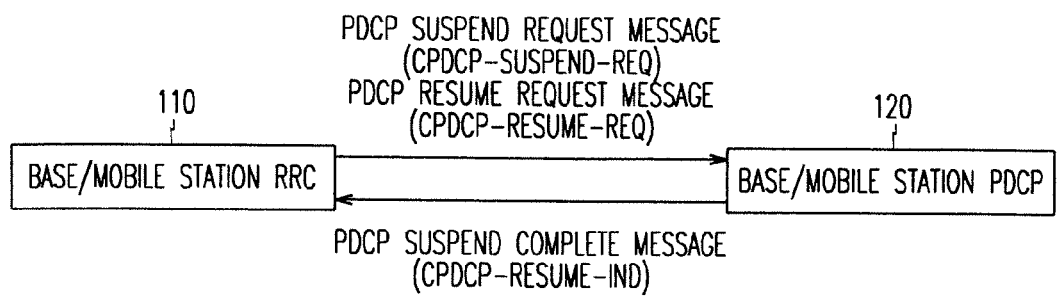
FIG. 1 is a diagram illustrating a method for recognizing a request for data transmission by a mobile/base station RRC using a network transfer device in accordance with an embodiment of the present invention.
Figure 1:
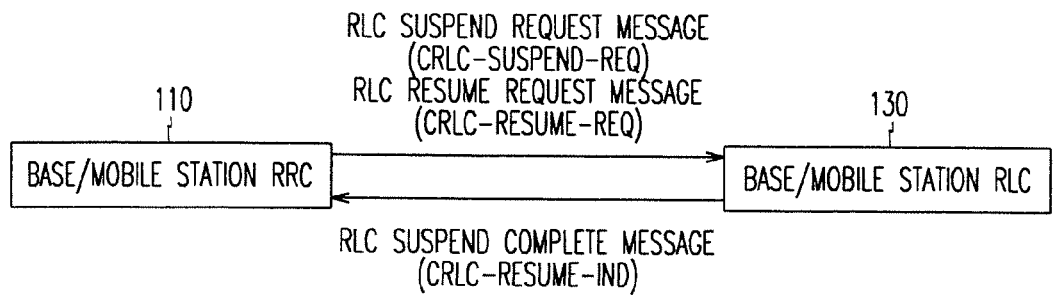

Hereinafter, a method for recognizing a request for data transmission by a mobile/base station RRC using a network transfer device according to an embodiment of the present invention will be described in detail with reference to the accompanying drawings. FIG. 1 shows a method for recognizing a request for data transmission by a mobile/base station RRC using a network transfer device in accordance with the embodiment of the present invention. As illustrated in FIG. 1, the network transfer device according to the present invention includes a mobile/base station PDCP 120 and a mobile/base station RLC 130.

Now, a description will be given to a method for recognizing a request for data transmission by a mobile/base station RRC 110 using the mobile/base station PDCP 120 as a network transfer device.

To transit from a suspend state (i.e., CELL_PCH or URA_PCH state) where recognition of a request for data transmission is disabled, to an active state (i.e., CELL_FACH state) where recognition of a request for data transmission is enabled, the mobile/base station RRC 110 sends a PDCP suspend request message to the mobile/base station PDCP 120 so as to transit the mobile/base station PDCP 120 to the suspend state in which the mobile/base station PDCP 120 can recognize a request for data transmission from a down/up link. Upon receiving the PDCP suspend request message, the mobile/base station PDCP 120 enters the suspend state and sends a PDCP suspend complete message to the mobile/base station RRC 110 to inform the mobile/base station RRC 110 of its transition to the suspend state. Upon receiving a request for data transmission from the up link (i.e., data transmission on a path from the mobile station to the base station) or the down link (i.e., data transmission on a path from the base station to the mobile station, the mobile/base station PDCP 120 in the suspend state sends a PDCP data transmission request recognizing message to the mobile/base station RRC 110 to inform the mobile/base station RRC 110 of the request for data transmission. As such, the mobile/base station RRC 110 that otherwise cannot recognize the request for data transmission is enabled to recognize the request for data transmission from the up/down link. Subsequently, upon receiving the PDCP data transmission request recognizing message, the mobile/base station RRC 110 transits from the suspend state in which it cannot recognize a request for data transmission to the active state (i.e., CELL_FACH state) in which it is enabled to recognize the request for data transmission. The mobile/base station RRC 100 then sends a PDCP resume request message to the mobile/base station PDCP 120 so that the PDCP 120 transits from the suspend state to the active state.

Next, a description will be given to a method for recognizing a request for data transmission by the mobile/base station RRC 110 using the mobile/base station RLC 130 as a second network transfer device.

To transit from a suspend state (i.e., CELL_PCH or URA_PCH state) where recognition of a request for data transmission is disabled, to an active state (i.e., CELL_FACH state) where recognition of a request for data transmission is enabled, the mobile/base station RRC 110 sends to the mobile/base station RLC 130 an RLC suspend request message for setting the mobile/base station RLC 130 in the suspend state in which the mobile/base station RLC 130 can recognize a request for data transmission from the down/up link. Upon receiving the RLC suspend request message, the mobile/base station RLC 130 enters the suspend state and sends an RLC suspend complete message to the mobile/base station RRC 110 to inform the mobile/base station RRC 110 of its transition to the suspend state. Upon receiving a request for data transmission from the up link (data transmission from the upper radio data transmission network, i.e., from the mobile station to the base station) or the down link (data transmission from the lower radio data transmission network, i.e., from the base station to the mobile station), the mobile/base station RLC 130 in the suspend state sends an RLC data transmission request recognizing message to the mobile/base station RRC 110 to inform the mobile/base station RRC 110 of the request for data transmission. As such, the mobile/base station RRC 110 that otherwise cannot recognize the request for data transmission is enabled to recognize the request for data transmission from the up/down link. Subsequently, upon receiving the RLC data transmission request recognizing message, the mobile/base station RRC 110 transits from the suspend state in which it cannot recognize a request for data transmission to the active state (i.e., CELL_FACH state) in which it is enabled to recognize the request for data transmission. The mobile/base station RRC 110 then sends an RLC resume request message to the mobile/base station RLC 130 to transit the RLC 130 from the suspend state to the active state.

Figure 2:
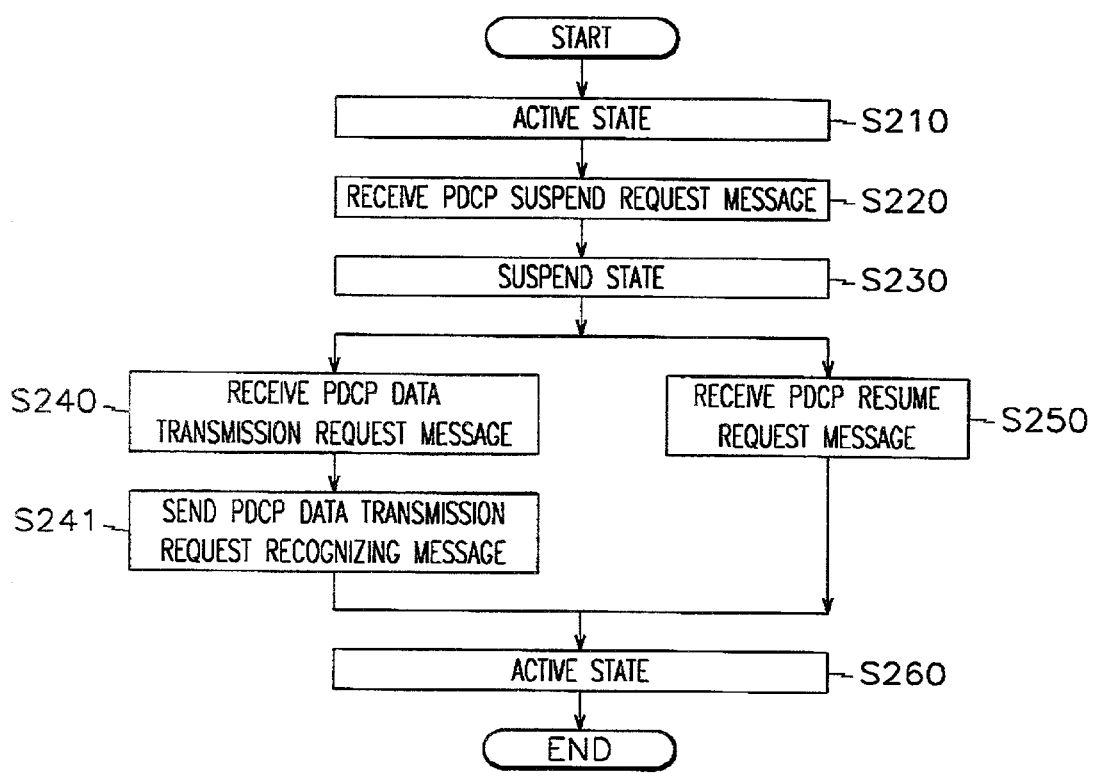
FIG. 2 is a flow chart illustrating an operation of the mobile/base station PDCP used as the network transfer device shown in FIG. 1.

Now, a detailed description will be given to a method for recognizing a request for data transmission by the mobile/base station RRC 110 using the network transfer device in accordance with the above aspect of the present invention. FIG. 2 is a flow chart illustrating an operation of the mobile/base station PDCP shown in FIG. 1.

First, the mobile/base station PDCP is in the active state where it can recognize a request for data transmission from the up/down link, in step S210. Upon receiving a PDCP suspend request message from the mobile/base station RRC, in step S220, the mobile/base station PDCP enters the suspend state according to the PDCP suspend request message in step S230. Subsequently, the mobile/base station PDCP in the suspend state operates according to the received message. If the mobile/base station PDCP receives a PDCP data transmission request message from the upper radio data transfer network, in step S240, it sends a PDCP data transmission request recognizing message to the mobile/base station RRC to inform the mobile/base station RRC of the request for data transmission, in step S241. Otherwise, if the mobile/base station PDCP receives a PDCP resume request message from the mobile/base station RRC, in step S250, it enters the active state according to the received message in step S260.

Figure 3:
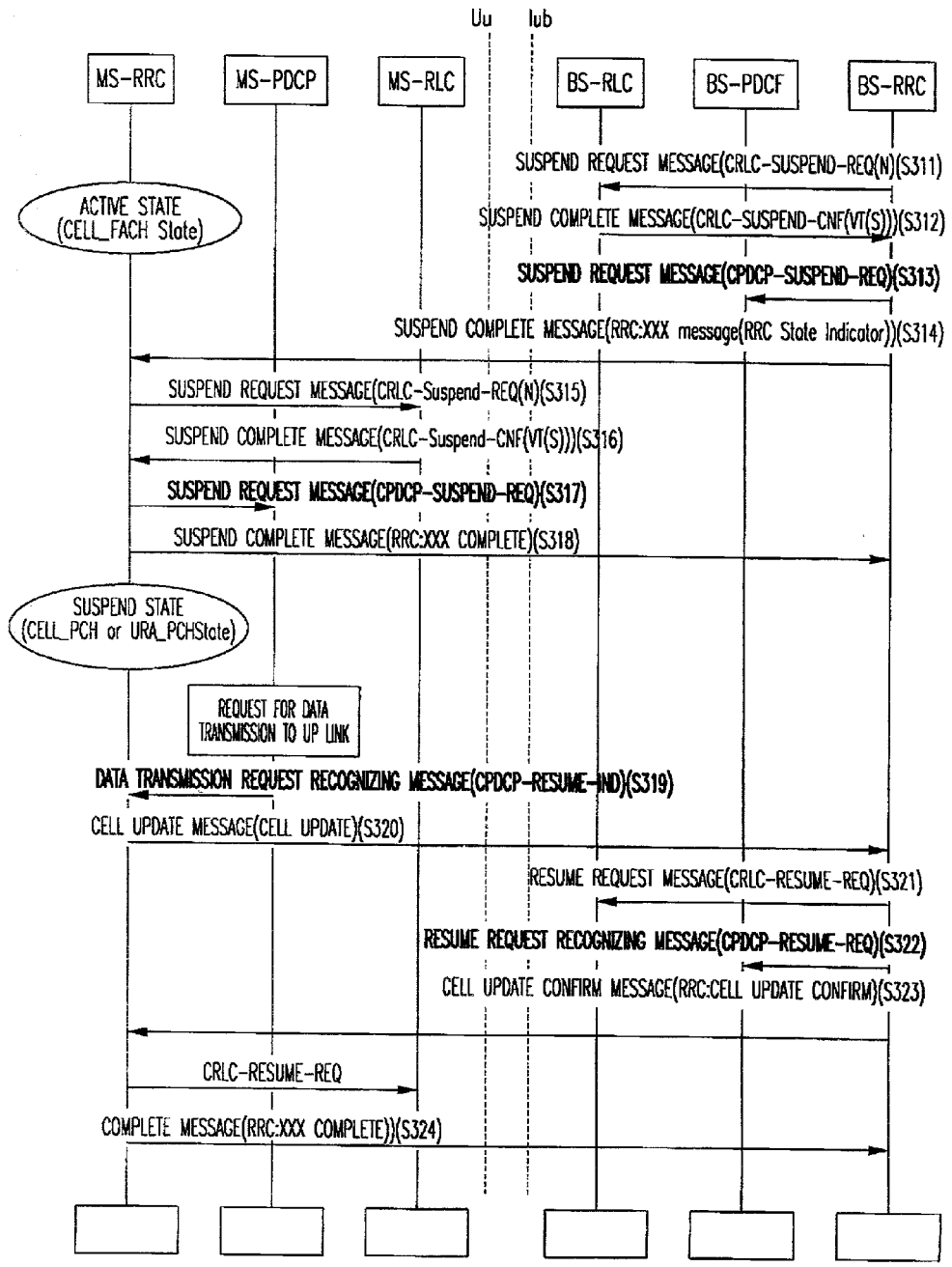
FIG. 3 is a diagram illustrating a process for state transition of the PDCP according to a request for data transmission from the up link.

Now, a detailed description will be given to a process for state transition of the PDCP according to a request for data transmission from the up link in the above-stated operation of the PDCP as a network transfer device. FIG. 3 shows a process for state transition of the PDCP according to a request for data transmission to the up link.

First, the base station RRC sets the base station RLC, belonging to the lower protocol network of the PDCP, in the suspend state, in step S311, and receives a suspend complete message from the base station RLC, in step S312. The base station RRC sets the base station PDCP in the suspend state, in step S313, and sends a message to the mobile station RRC to inform the mobile station RRC that the base station PDCP/RLC is in the suspend state, in step S314. The mobile station RRC receives a corresponding message from the base station RRC and sets the mobile station RLC and the mobile station PDCP in the suspend state in the same manner as the base station RRC. That is, the mobile station RRC sets the mobile station RLC in the suspend state, in steps S315 and S316, and then sets the mobile station PDCP in the suspend state, in step S317. Subsequently, the mobile station RRC sends a suspend complete message to the base station RRC, in step S318.

Upon receiving a request for data transmission to the up link after the completion of setting the suspend state, the mobile station PDCP in the suspend state sends a PDCP data transmission request recognizing message to the mobile station RRC to inform the mobile station RRC of the request for data transmission, in step S319. The mobile station RRC sends a cell update message to the base station RRC for a transition to the active state, in step S320. The base station RRC enters the active state according to the received cell update message and sends a data transmission request recognizing message to the base station RLC, in step S321, and then to the base station PDCP, in step S322. Subsequently, the base station RRC sends a message to the mobile station RRC to inform the mobile station RRC of the base station's transition to the active state, in step S323, accordingly, the mobile station RRC also enters the active state and sends a complete message to the base station RRC, in step S324.

Figure 4:
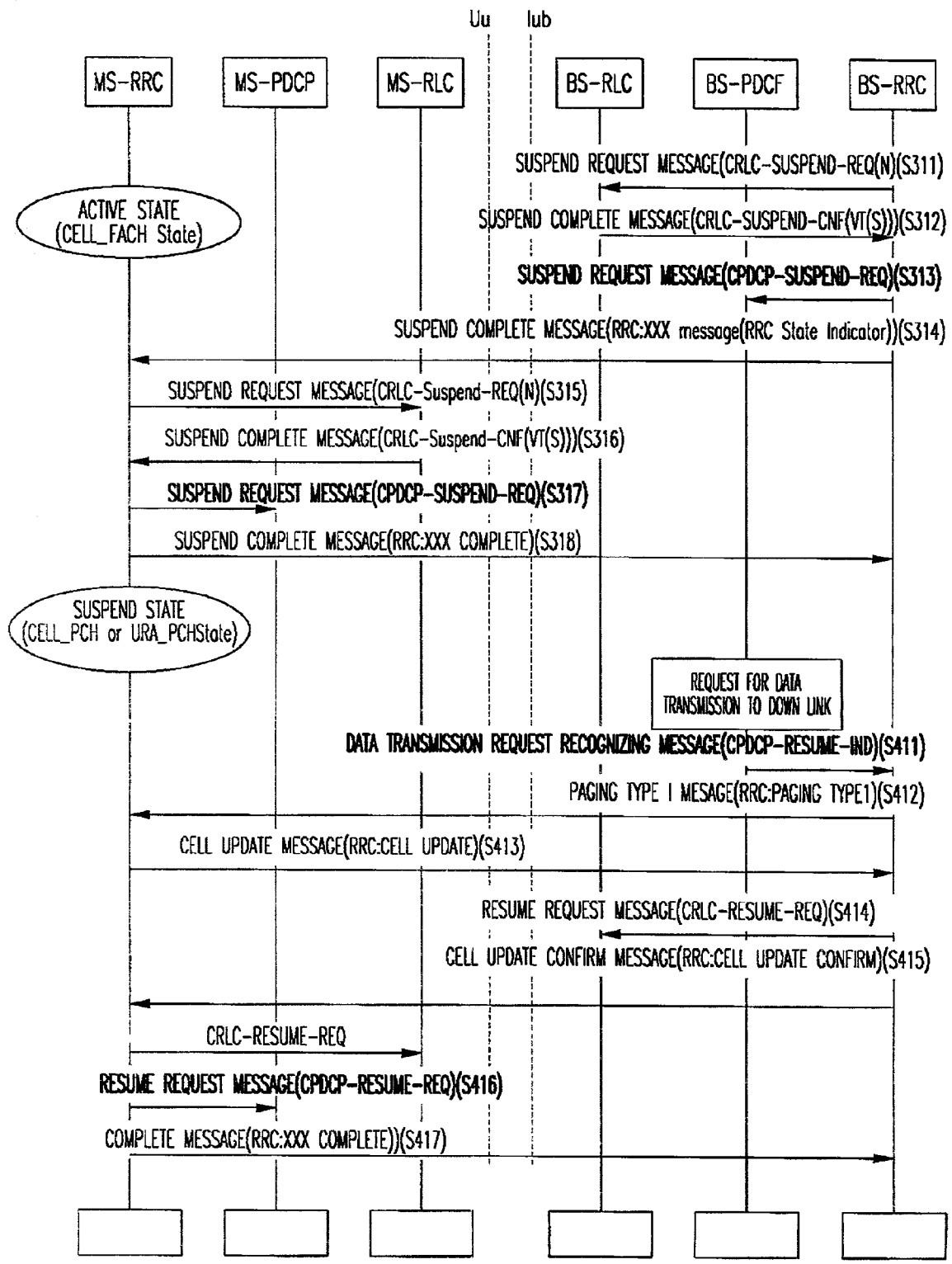
FIG. 4 is a diagram illustrating a process for state transition of the PDCP according to a request for data transmission from the down link.

Now, a detailed description will be given to a process for state transition of the PDCP according to a request for data transmission to the down link in the above-stated operation of the PDCP. FIG. 4 shows a process for state transition of the PDCP according to a request for data transmission to the down link.

The process for setting the mobile/base station PDCP and RLC in the suspend state by the mobile/base station RRC is the same as described in FIG. 3 and will not be described.

Upon receiving a request for data transmission to the down link, the base station PDCP, which is set in the suspend state by the mobile/base station RRC and thereby disabled to recognize a request for data transmission, sends a PDCP data transmission request recognizing message to the base station RRC to inform the base station RRC about the request for data transmission, in step S411. The base station RRC receiving the PDCP data transmission request recognizing message sends a paging type I message to the mobile station RRC for a transition to the active station, in step S412. The base station RRC receives a corresponding cell update message from the mobile station RRC, in step S413, and performs a transition to the active state according to the received message. The base station RRC sends a PDCP resume request message to the RLC so that the base station RLC enters the active state, in step S414. The base station RRC sends a cell update confirm message to the mobile station RRC, in step S415. The mobile station RRC receiving the corresponding message enters the normal state and sends a PDCP resume request message to the mobile station PDCP, in step S416. Thus the mobile station PDCP transits to the active state according to the received PDCP resume request message, and the mobile station RRC sends a PDCP suspend complete message to the base station RRC, in step S417.

Figure 5:
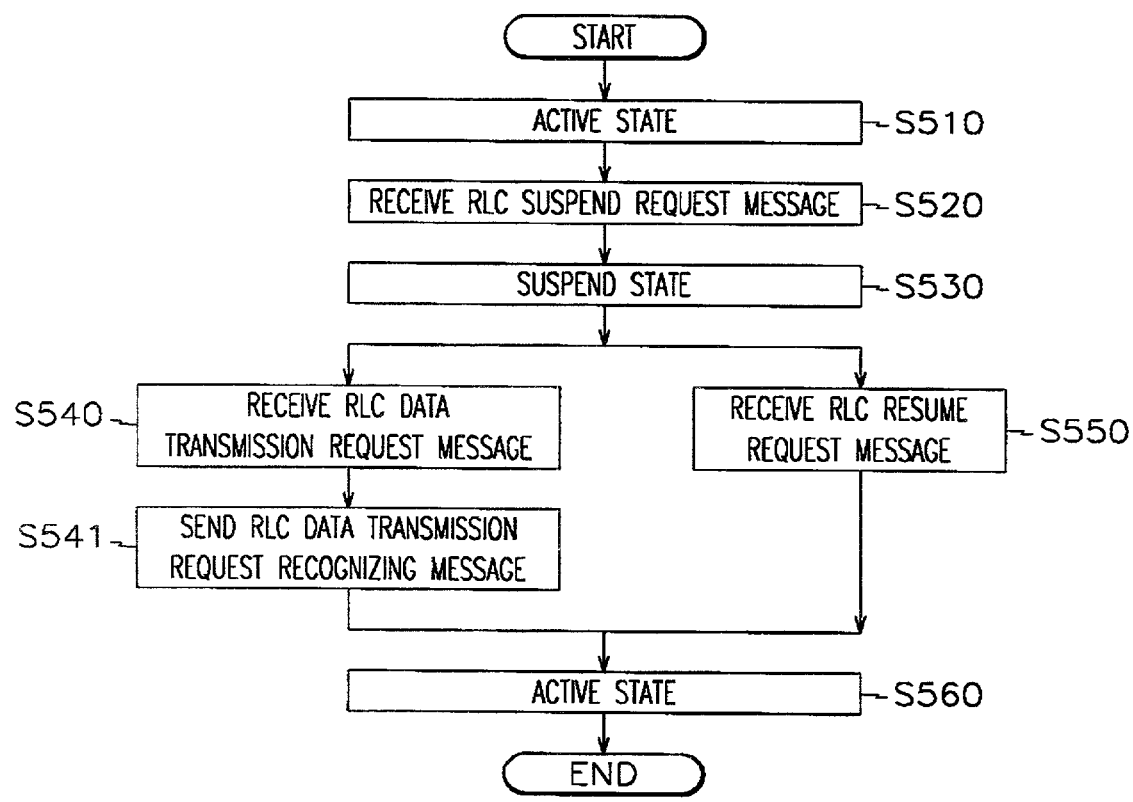
FIG. 5 is a flow chart illustrating an operation of the mobile/base station RLC used as the network transfer device shown in FIG. 1.

Finally, an operation of the mobile/base station RLC as a network transfer device according to the present invention will be described as follows. FIG. 5 is a flow chart illustrating an operation of the mobile/base station RLC shown in FIG. 1.

As illustrated in the figure, the mobile/base station RLC is in the state (i.e., CELL_FACH state) where it can recognize a request for data transmission to the up/down link, in step S510. Upon receiving an RLC suspend request message from the mobile/base station RRC, in step S520, the mobile/base station RLC enters the suspend state in step S530. Subsequently, the mobile/base station RLC in the suspend state operates according to the received message. If the mobile/base station RLC receives an RLC data transmission request message from the up link, in step S540, it sends an RLC data transmission request recognizing message to the mobile/base station RRC to inform the mobile/base station RRC of the request for data transmission, in step S541. Otherwise, if the mobile/base station RLC receives an RLC resume request message from the mobile/base station RRC, in step S550, it enters the active state (i.e., the data transfer ready state), in step S560.

Figure 6:
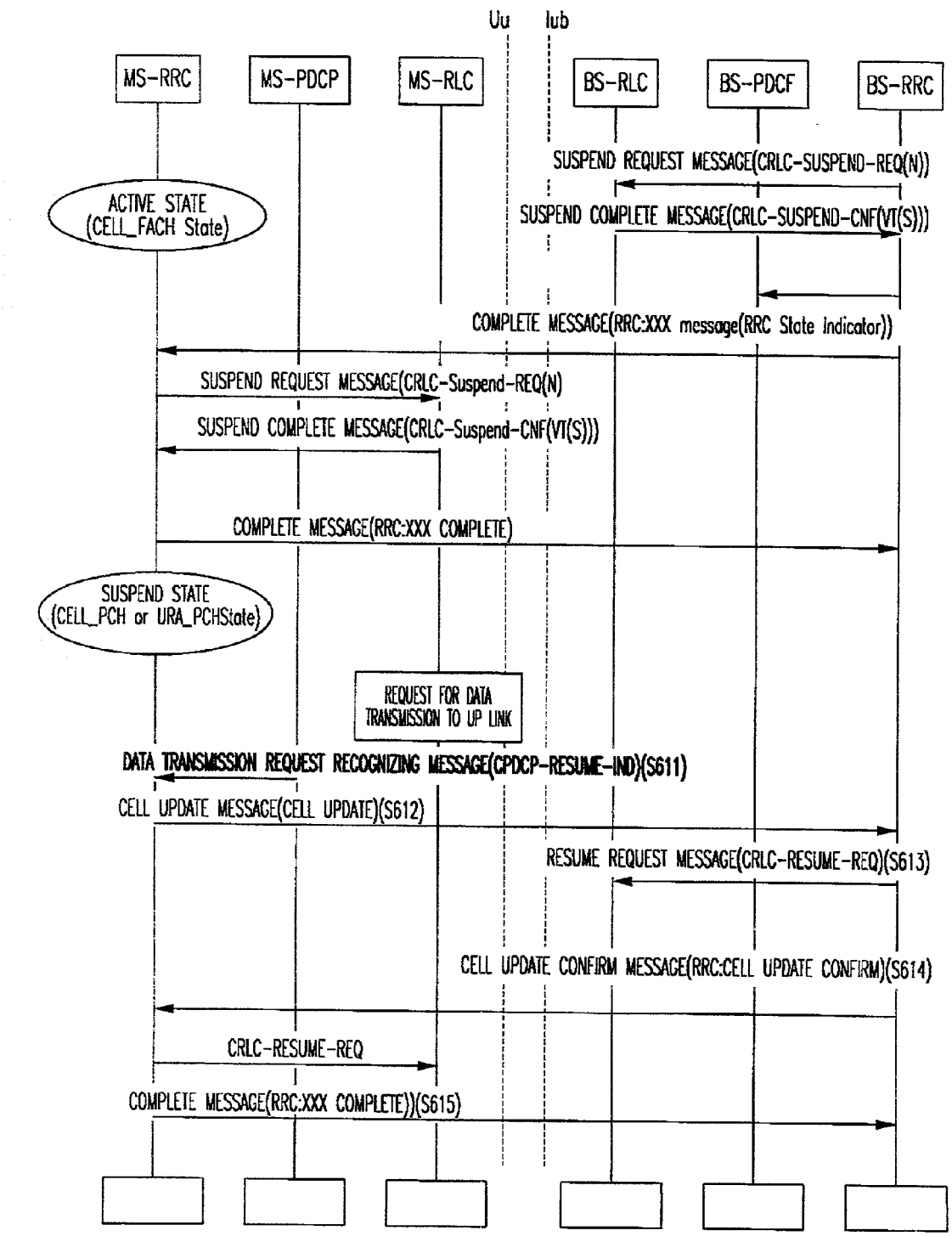
FIG. 6 is a diagram illustrating a process for state transition of the RLC according to a request for data transmission from the up link.

Now, a detailed description will be given to a process for state transition of the RLC according to a request for data transmission to the up link in the above-stated operation of the RLC as a network transfer device. FIG. 6 shows a process for state transition of the RLC according to a request for data transmission to the up link.

The process for setting the mobile/base station RLC in the suspend state by the mobile/base station RRC is the same as illustrated in FIG. 3, excepting the process for setting the mobile/base station PDCP in the suspend state, and will not be described here.

Upon receiving a request for data transmission to the up link in the state where recognition of a request for data transmission is disabled, the mobile station RLC sends an RLC data transmission request recognizing message to the mobile station RRC to inform the mobile station RRC of the request for data transmission, in step S611. The mobile station RRC then sends a cell update message to the base station RRC for a transition to the active state (e.g., the CELL_FACH state), in step S612. The base station RRC enters the active state according to the received cell update message and sends a cell update confirm message to the mobile station RRC, in step S614. Subsequently, the mobile station RRC enters the active state according to a corresponding message and sends a complete message to the base station RRC, in step S615.

Figure 7:
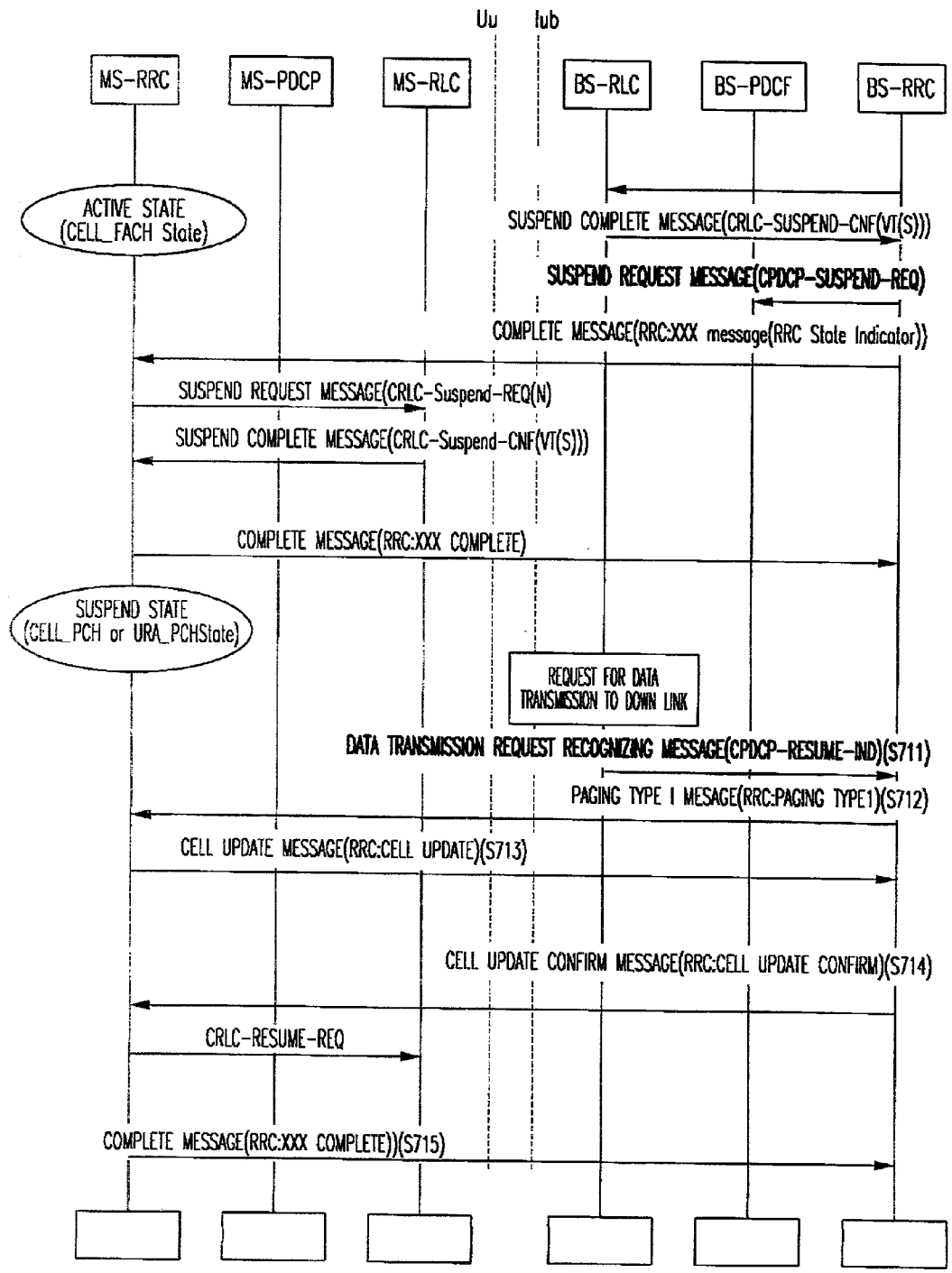
FIG. 7 is a diagram illustrating a process for state transition of the RLC according to a request for data transmission from the down link.

Now, a detailed description will be given to a process for state transition of the RLC according to a request for data transmission to the down link in the above-stated operation of the RLC. FIG. 7 shows a process for state transition of the RLC according to a request for data transmission to the down link.

The process for setting the mobile/base RLC in the suspend state by the mobile/base station RRC is the same as shown in FIG. 3, excepting the process for setting the mobile/base station PDCP in the suspend state, and will not be described here.

Upon receiving a request for data transmission from the down link in the state where recognition of a request for data transmission is disabled, the base station RLC sends an RLC data transmission request recognizing message to the base station RRC to inform the base station RRC about the request for data transmission, in step S711. The base station RRC receiving the RLC data transmission request recognizing message sends a paging type I message to the mobile station RRC for a transition to the active station, in step S712. The base station RRC receives a corresponding cell update message from the mobile station RRC, in step S713, and performs a transition to the active state according to the received message. The base station RRC sends a cell update confirm message to the mobile station RRC, in step S714. The mobile station RRC receiving the corresponding message enters the active state and sends a complete message to the base station RRC, in step S715.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention makes use of message communications between the mobile/base station RRC and the mobile/base station RLC/PDCP that is capable of recognizing a request for data transmission to the up/down link, efficiently using the radio resources (i.e., not in the CELL_FACH state while not in use) and reducing the initial access overhead (i.e., disconnecting while not in use).

What is claimed is:

1. A method for recognizing a request for data transmission by a mobile station RRC (Radio Resource Control) or a base station RRC using a network transfer device, by which the mobile station RRC or the base station RRC can recognize the request for data transmission using the network transfer device in a state where recognition of the request for data transmission is disabled, the method comprising:

(a) the mobile station RRC setting the network transfer device of the base station in a suspend state to recognize a request for data transmission from an up link or the base station RRC setting the network transfer device of the mobile station in a suspend state to recognize a request for data transmission from a down link, (a-1) the base station RRC setting a base station RLC (Radio Link Control) in the suspend state and then setting a base station PDCP (Packet Data Convergence Protocol) in the suspend state; and (a-2) the mobile station RRC setting the mobile station RLC in the suspend state and then setting a base station PDCP in the suspend state;

(b) the network transfer device in the suspend state sending a message to the mobile station RRC or the base station RRC to inform the mobile station RRC that it recognizes the request for data transmission in the case of recognizing the request for data transmission to an up link, and the network transfer device of the base station in the suspend state sending a message to the base station RRC to inform the mobile station RRC that it recognizes the request for data transmission in the case of recognizing the request for data transmission to a down link;

(c) the mobile station RRC or the base station RRC recognizing the request for data transmission according to a received message from the network transfer device and transiting to an active state; and (d) the network transfer device transiting to the active state by the RRC transited to the active state.

2. The method as claimed in claim 1, wherein the network transfer device comprises an RLC protocol control network of the mobile station or the base station.

3. The method as claimed in claim 1, wherein the network transfer device is a PDCP control network of the mobile station or the base station.

* * * * *